US012789431B2

(12) United States Patent
Jackson

(10) Patent No.: US 12,789,431 B2
(45) Date of Patent: Nov. 10, 2026

(54) INJECTION MOLDING METHOD AND INJECTION MOLD

(71) Applicant: NIFCO AMERICA CORP., Canal Winchester, OH (US)

(72) Inventor: Barry Jackson, Shelbyville, KY (US)

(73) Assignee: NIFCO AMERICA CORP., Canal Winchester, OH (US)

( * ) Notice: Subject to any disclaimer, the term of this patent is extended or adjusted under 35 U.S.C. 154(b) by 156 days.

(21) Appl. No.: 18/761,196

(22) Filed: Jul. 1, 2024

(65) Prior Publication Data

US 2026/0001263 A1 Jan. 1, 2026

(51) Int. Cl.
*B29C 45/44* (2006.01)
*B29C 45/33* (2006.01)
*B29L 31/00* (2006.01)

(52) U.S. Cl.
CPC .............. *B29C 45/44* (2013.01); *B29C 45/33* (2013.01); *B29L 2031/727* (2013.01)

(58) Field of Classification Search
CPC ......... B29C 45/44; B29C 45/33; B29C 45/04; B29C 45/0408; B29C 45/338; B29C 45/4435; B29C 45/26; B29C 2045/334; B29C 2045/338; B29L 2031/727
See application file for complete search history.

(56) References Cited

U.S. PATENT DOCUMENTS 3,373,460 A * 3/1968 Ladney, Jr. ......... B29C 45/4421 425/417
3,905,740 A * 9/1975 Lovejoy .............. B29C 45/4421 425/573
4,570,897 A * 2/1986 Von Holdt ............... B65D 1/12 249/162
2016/0214297 A1* 7/2016 Kim ........................ B29C 45/44

* cited by examiner

*Primary Examiner* — Monica A Huson
(74) *Attorney, Agent, or Firm* — HAUPTMAN HAM, LLP

(57) ABSTRACT

An injection molding method for manufacturing a fastener device having an umbrella style seal includes providing a mold having at least a first set of two angled slides defining a shape of a fastening portion and an inside surface of an umbrella of the fastener device, and a second set of two straight slides defining a shape of a head, an anchor stem and an outside surface of the umbrella of the fastener device; assembling the first set of the two angled slides, and the second set of two straight slides to form the mold cavity; injection molding plastic into the mold cavity; and separating the first set of the two angled slides parallel to an upper surface of the umbrella in a direction angled with respect to the second set of the two straight slides, and separating the second set of the two straight slides laterally.

4 Claims, 4 Drawing Sheets

INJECTION MOLDING METHOD AND INJECTION MOLD

FIELD OF THE INVENTION

The present invention relates to an injection molding method which can be used to make a fastener device with an umbrella style seal, and an injection mold. More particularly, the invention relates to a manufacturing process that is used to make a fastener device comprising a fastener part having a plastic head, anchor stem, an umbrella seal and fastening portion with a more consistent and stable umbrella construction, and the injection mold.

BACKGROUND OF THE INVENTION

Fastener devices are formed of injection molded plastic which are used to secure trim components to portions of a vehicle body through these fastener devices. The current injection molding method used to make these fastener devices use undercut slides to make umbrella seals on these fastener devices. These undercut slides pull the inside surface of the umbrella seal when the mold is opened. The umbrella seal must flex and conform to the shape of the slides as they move over the surface thereof.

However, the conventional method can increase possibility of breaking or weakening the umbrella seals. The conventional method also makes the fastener devices exit the mold in an uncontrollable direction, and cause pulling and distorting the head thereof while the plastic material is still in its pliable state. This also makes it difficult to collect components for shipment.

In reference to prior art, FIG. 1 is an isometric view of a conventional fastener device 100, and FIG. 2 is a cross sectional view taken along 2-2 of FIG. 1. As shown in FIGS. 1 and 2, the fastener device 100 of the prior art comprises a head 1, an anchor stem 2, an umbrella seal 3 and a fastener device 4.

FIG. 3 is a profile view of a method 101 for making the prior art fastener device 100. During opening of a cavity after plastic has been injection into a tool 13, slides consisting of a straight slide 9 and a straight slide 10 move horizontally away from the head 1, anchor stem 2, a top surface 5 and a bottom surface 8 of the umbrella seal 3. As the straight slide 9 and the straight slide 10 are pulled away from the fastener device 100, the inside surface 5 and the outside surface 8 of the umbrella seal 3 are flexed downward to conform to the shape of the straight slide 9 and the straight slide 10.

Since the umbrella seal flexes and conforms to the shape of the slides as they move over the surface, the umbrella seal may possibly be broken or weakened. Also, the fastener devices may exit the mold in an uncontrollable direction, and the head may be pulled and distorted while the plastic material is still in its pliable state.

Accordingly, it would be advantageous to provide an injection molding method with slide features adapted to create the umbrella seals without having this type of undercut slide that can break or weaken the umbrella seals. Further, it would be advantageous to have an injection molding method that will not distort the head during the ejection of the cavity.

In view of the trouble of the conventional method, it is an object of the invention to provide an injection molding method for manufacturing a fastener device having an umbrella style seal without trouble.

Further objects and advantages of the invention will be apparent from the following description.

SUMMARY OF THE INVENTION

In a first aspect of the invention, an injection molding method is configured to manufacture a fastener device having an umbrella style seal. The invention molding method comprises providing a mold defining a mold cavity for the fastener device and having at least a first set of two angled slides defining a shape of a fastening portion and an inside surface of an umbrella of the fastener device, and a second set of two straight slides defining a shape of a head, an anchor stem and an outside surface of the umbrella of the fastener device; assembling the first set of the two angled slides, and the second set of two straight slides to form the mold cavity; injection molding plastic into the mold cavity; and separating the first set of the two angled slides parallel to an upper surface of the umbrella in a direction angled with respect to the second set of the two straight slides, and separating the second set of the two straight slides laterally outwardly from the outside surface of the umbrella.

In a second aspect of the invention, the mold cavity includes a first cavity for the head forming a plate with an anchor stem protruding from a center of the head, a second cavity for a surface of the umbrella, having an angled shape extending up and outward from the first cavity forming the anchor stem on an end opposite to the head, and a third cavity for the fastening portion extending up from the second cavity forming a base of the umbrella with internal open cavities within the fastener device having parallel cavity surfaces to the upper surface of the umbrella.

In a third aspect of the invention, each of the two straight slides includes an upper surface angled with respect to a lower surface thereof so that the angled slides are removed with an angle with respect to the two straight slides.

In fourth aspect of the invention, an injection mold for a fastener device having an umbrella style seal, comprises a mold defining a mold cavity for the fastener device, the mold including a first set of two angled slides defining a shape of a fastening portion and an inside surface of an umbrella of the fastener device, and a second set of two straight slides defining a shape of a head, an anchor stem and an outside surface of the umbrella of the fastener device, disposed under the first set of two angled slides.

In a fifth aspect of the invention, the mold cavity further includes a first cavity for the bead forming a plate with an anchor stem protruding from a center of the head, a second cavity for a surface of the umbrella, having an angled shape extending up and outward from the first cavity forming the anchor stem on an end opposite to the head, and a third cavity for the fastening portion extending up from the second cavity forming a base of the umbrella with internal open cavities within the fastener device having parallel cavity surfaces to the upper surface of the umbrella.

In the invention, the fastening device can be made without any trouble.

BRIEF DESCRIPTIONS OF THE DRAWINGS

DETAILED DESCRIPTION OF THE INVENTION

The following detailed description is exemplary in nature and is not intended to limit the application and uses. Furthermore, there is no intention to be bound by any theory presented by the following detail.

Figure 1:
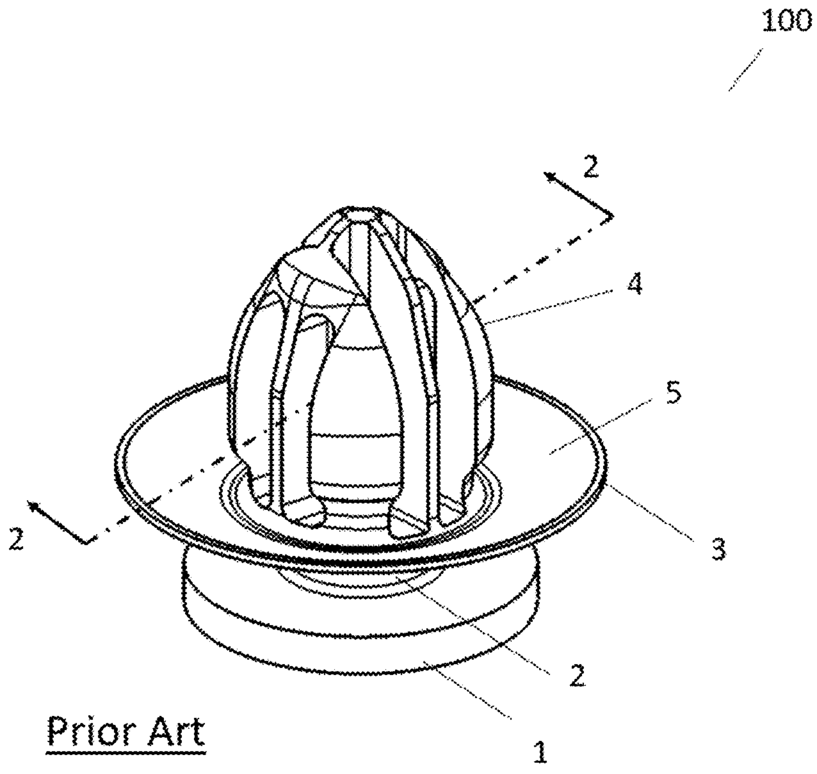
FIG. 1 is an isometric view of a fastener device of the prior art.
Figure 2:
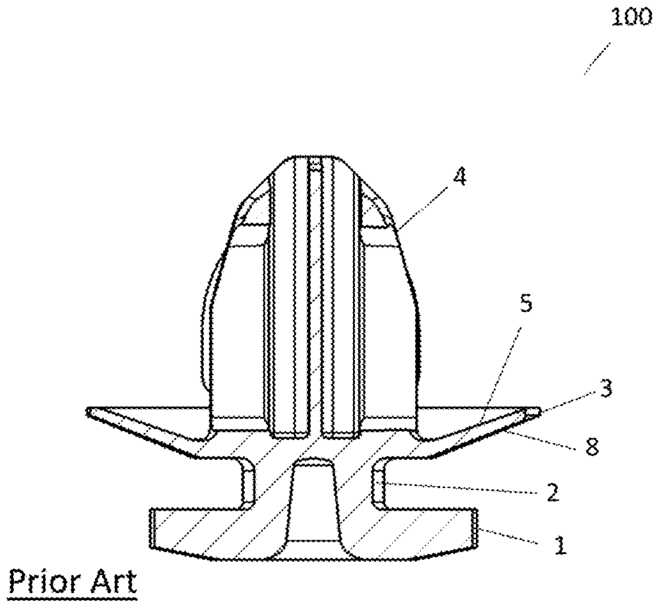
FIG. 2 is a cross section view taken along a line 2-2 in FIG. 1.
Figure 3:
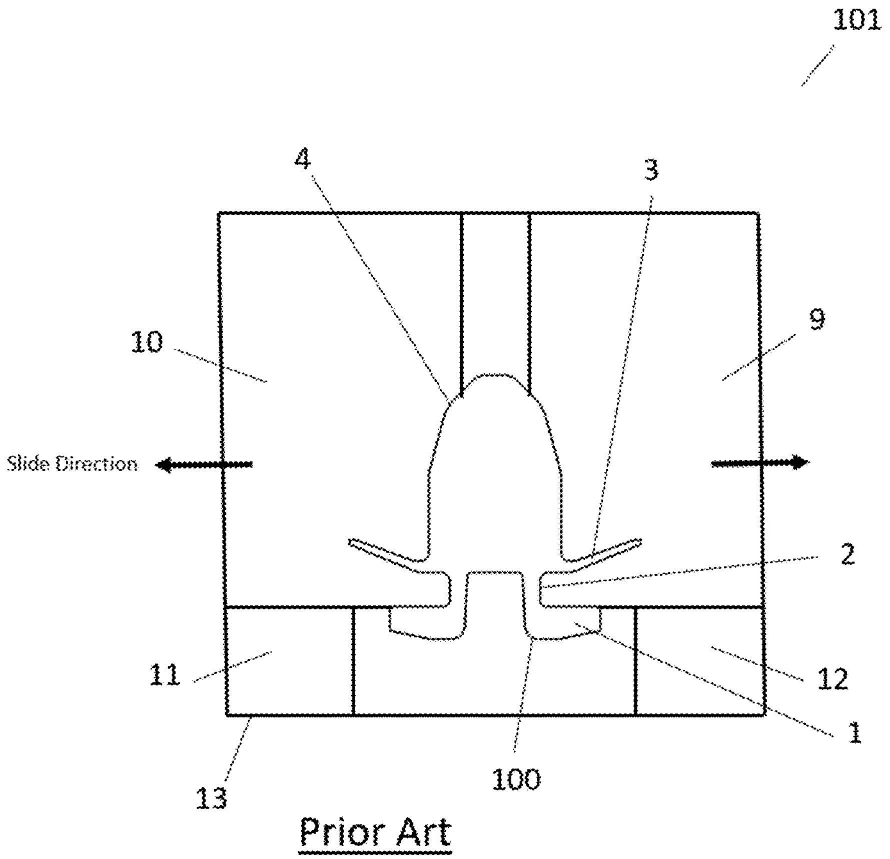
FIG. 3 shows a profile in performing an injection molding method of a fastener device of the prior art.
Figure 4:
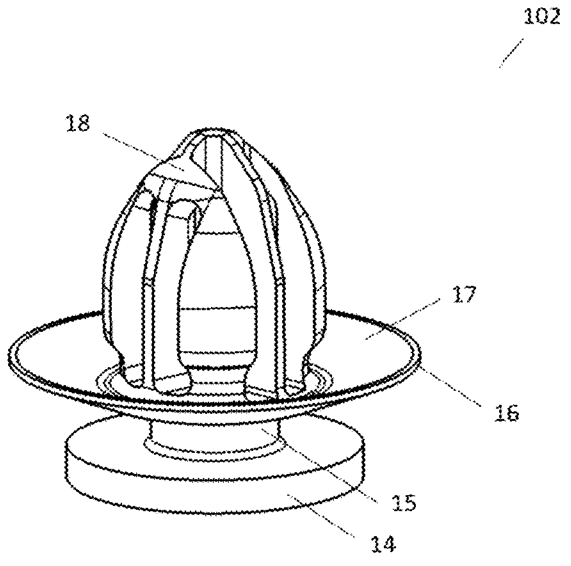
FIG. 4 is an isometric view of a fastener device of the present invention.
Figure 5:
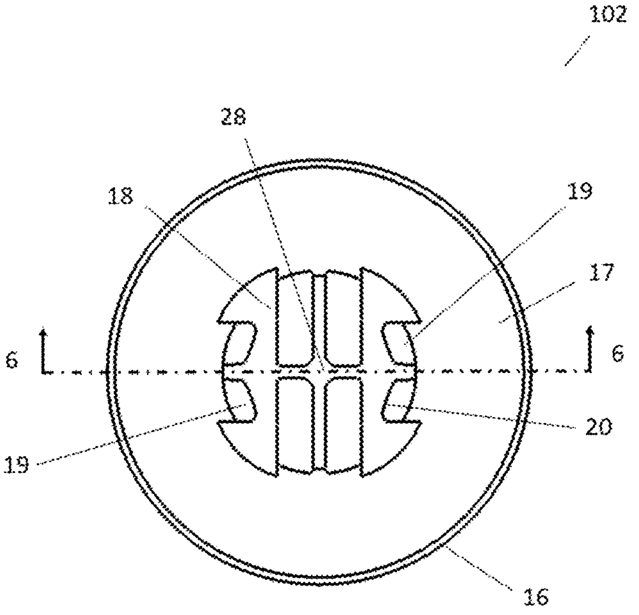
FIG. 5 is a plan view of the fastener device.
Figure 6:
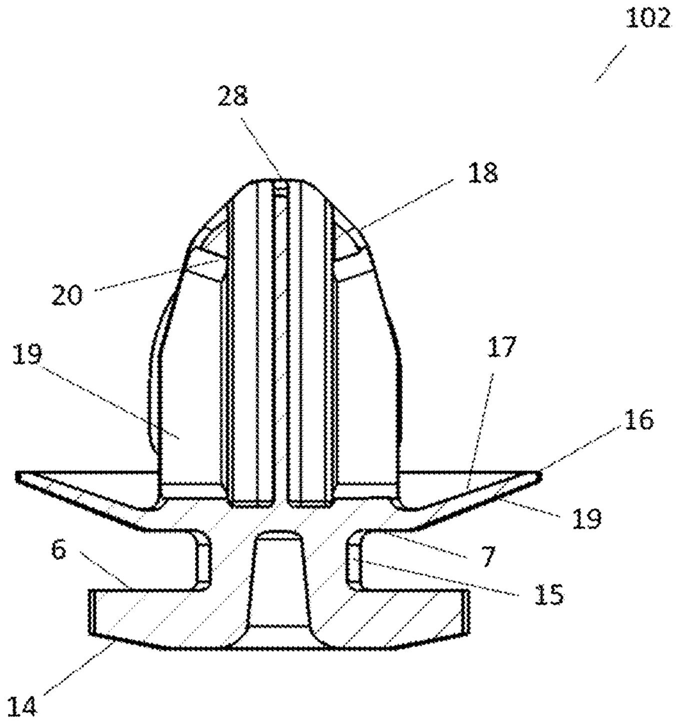
FIG. 6 is a cross section view taken along a line 6-6 in FIG. 5.

FIG. 4 shows an isometric view of a fastener device 102 of the present invention; FIG. 5 is a plan view thereof; and FIG. 6 is a cross section view taken along a line 6-6 in FIG. 5.

The fastener device 102 comprises a head 14, an anchor stem 15 extending from the head 14, an umbrella seal 16 extending from the anchor stem 15, and a fastener device 18 attached to the umbrella seal 16. The head 14, the anchor stem 15, the umbrella seal 16 and the fastener device 18 are integrally formed together.

Figure 7:
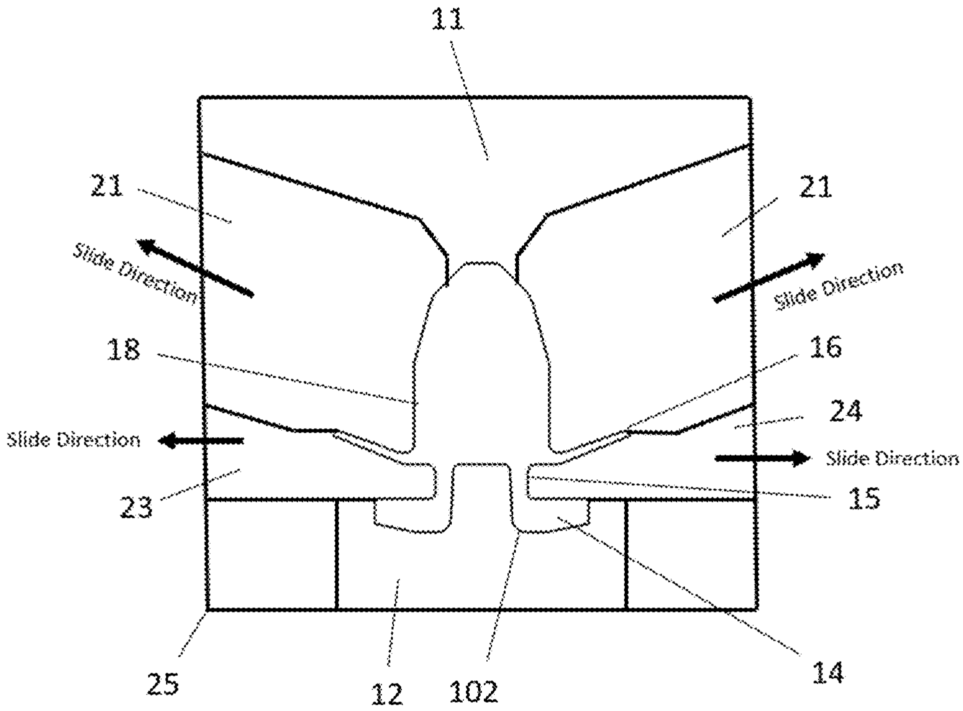
FIG. 7 shows a profile in performing the injection molding method of the fastener device of the present invention.
Figure 8:
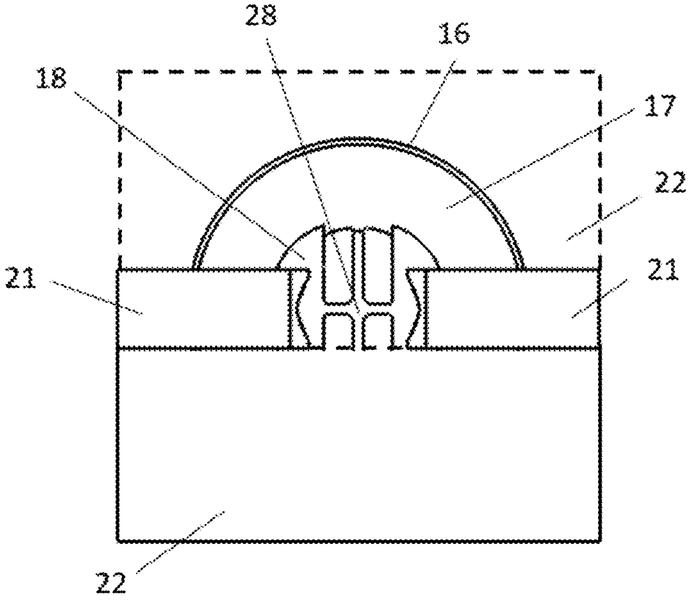
FIG. 8 is an explanatory plan view for showing a mold of the invention.

The head 14 is a circular shape plate with a circular shaped anchor stem 15 protruding from the center of the head 14. An angled circular shape umbrella seal 16 extends up and outward from the anchor stem 15 on the opposite end where the head 14 is located. The fastener device 18 extends up from a base of the umbrella seal 16 with internal open cavities 19 within the fastener device 18 having parallel cavity surfaces 20 to the inside surface 17 of the umbrella seal 16, FIG. 7 shows an explanatory view showing a molding method using a tool 25 which is used to manufacture the fastener device 102, and FIG. 8 is an explanatory plan view of the tool 25. The tool 25 comprises an upper slide 11, a lower slide 12, a set of upper side slides including a pair of angled slides 21 and a pair of angled slides 22, and a set of lower side slides including a straight slide 23 and a straight slide 24. The upper slide 11 forms a tip end 28 of the fastener device 18, and the lower slide 12 forms the head 14 of the fastener device 102.

The angled slides 21 and the angled slides 22 form a side profile of the fastener device 18 and the inside surface 17 of the umbrella seal 16. The straight slide 23 and the straight slide 24 form the bottom surface 6 of the head 14, the anchor stem 15, the bottom surface 7 and an outside surface 19 of the umbrella seal 16.

In forming the fastener device 18, the slides 11, 12, 21, 22, 23, 24, 25 forming the tool 25 are assembled, as shown in FIG. 7. Then, plastic is injected in the tool 25.

After plastic has been injected into the tool 25 and a calculated amount of cooling time has passed, the upper slide 11 and the lower slide 12 are separated to open the cavity. The angled slides 21 and the angled slides 22 are pulled away from the fastener device 18 at angled directions.

The angle at which the angled slides 21 and the angled slides 22 move corresponds to the same angle at which the inside surface 17 of the umbrella seal 16 is set, allowing the slides to move along the inside surface 17 without flexing the umbrella seal 16. After a short mechanical delay, the straight slide 23 and the straight slide 24 are also moved away from the fastener device 102 without disturbing the umbrella seal 16. This process allows the fastener device 102 to be smoothly ejected from the tool 25 in a consistent motion.

The slides 11, 12 are respectively formed of one piece, and the slides 21, 22 are divided respectively to two pieces. The slides 23, 24 are respectively formed of one piece. However, the slides can be divided into several pieces in circumferential directions according to the shape of the tool 25, e.g. the shape of the head 14, the anchor stem 15 and the fastener device 18. Each of the slide 11 and the slide 12 may be divided to two or more pieces. Each of the slides 23, 24 forming the head 14, the anchor stem 15 and the bottom of the umbrella seal 16 may be divided into two or more pieces, to laterally open the tool 25. However, each of the angled slides 21, 22 are divided into several pieces according to the number of the fastener device 18.

While the invention has been explained with reference to the specific structure of the embodiment, the explanation is illustrative and the invention is limited only by the appended claims.

What is claimed is:

1. An injection molding method for manufacturing a fastener device having an umbrella style seal, comprising:

providing a mold defining a mold cavity for the fastener device and having a set of two angled slides defining a shape of a fastening portion and an inside surface of an umbrella of the fastener device, and a set of two straight slides defining a shape of a head, an anchor stem and an outside surface of the umbrella of the fastener device, assembling the set of the two angled slides, and the set of two straight slides to form the mold cavity, injection molding plastic into the mold cavity, and separating the set of the two angled slides parallel to an upper surface of the umbrella in a direction angled with respect to the set of the two straight slides, and separating the set of the two straight slides laterally outwardly from the outside surface of the umbrella.

2. The method according to claim 1, wherein said mold cavity includes a first cavity for the head forming a plate with an anchor stem protruding from a center of the head, a second cavity for a surface of the umbrella, having an angled shape extending up and outward from the first cavity forming the anchor stem on an end opposite to the head, and a third cavity for the fastening portion extending up from the second cavity forming a base of the umbrella with internal open cavities within the fastener device having parallel cavity surfaces to the upper surface of the umbrella.

3. The method according to claim 2, wherein each of the two straight slides includes an upper surface angled with respect to a lower surface thereof so that the angled slides are removed with an angle with respect to the two straight slides.

4. The method according to claim 3, wherein the mold defining the cavity further includes an upper portion disposed on the two angled slides, and a lower portion disposed under the two straight slides.

* * * * *